(12) United States Patent
Rothschild (10) Patent No.: US 8,534,551 B2
(45) Date of Patent: *Sep. 17, 2013

(54) SYSTEM AND METHOD FOR ISSUING DIGITAL RECEIPTS FOR PURCHASE TRANSACTIONS OVER A NETWORK

(75) Inventor: Leigh M. Rothschild, Sunny Isles Beach, FL (US)

(73) Assignee: Clayco Research Limited Liability Company, Wilmington, DE (US)

( * ) Notice: Subject to any disclaimer, the term of this patent is extended or adjusted under 35 U.S.C. 154(b) by 66 days.

This patent is subject to a terminal disclaimer.

(21) Appl. No.: 13/018,876

(22) Filed: Feb. 1, 2011

(65) Prior Publication Data

US 2011/0145083 A1 Jun. 16, 2011

Related U.S. Application Data (63) Continuation of application No. 11/369,598, filed on Mar. 7, 2006, now Pat. No. 7,896,242, which is a continuation-in-part of application No. 11/212,419, filed on Aug. 26, 2005, now Pat. No. 7,575,154.

(51) Int. Cl.
G06K 15/00 (2006.01)
G06G 5/00 (2006.01)

(52) U.S. Cl.
USPC .............................. 235/383; 705/24

(58) Field of Classification Search
USPC ..................... 235/379, 383; 705/24
See application file for complete search history.

(56) References Cited

U.S. PATENT DOCUMENTS

| | | | |
|---|---|---|---|
| 5,256,863 | A | 10/1993 | Ferguson et al. |
| 5,739,512 | A | 4/1998 | Tognazzini |
| 6,144,948 | A | 11/2000 | Walker et al. |
| 6,741,968 | B2 | 5/2004 | Jacoves et al. |
| 7,472,088 | B2 | 12/2008 | Taylor et al. |
| 7,487,912 | B2 | 2/2009 | Seifert et al. |
| 7,546,266 | B2 | 6/2009 | Beirne et al. |
| 7,575,154 | B2 | 8/2009 | Rothschild |
| 7,896,242 | B2 | 3/2011 | Rothschild |
| 7,904,384 | B2 | 3/2011 | Lilly et al. |
| 2002/0188559 | A1 | 12/2002 | Schultz |
| 2003/0050850 | A1 | 3/2003 | Sesek |
| 2004/0064373 | A1 | 4/2004 | Shannon |
| 2004/0078282 | A1 | 4/2004 | Robinson |
| 2004/0193538 | A1 | 9/2004 | Raines |
| 2007/0083400 | A1 | 4/2007 | Katz |
| 2007/0272740 | A1 | 11/2007 | Palacios |
| 2009/0271265 | A1 | 10/2009 | Lay et al. |
| 2010/0257066 | A1 | 10/2010 | Jones et al. |

Primary Examiner — Jamara Franklin
(74) Attorney, Agent, or Firm — Woodcock Washburn LLP (57) ABSTRACT

A system and method for providing digital receipts for purchase transactions are provided. The method includes the steps receiving information for a first credit card account for executing a transaction; retrieving a first customer record from a database using information from the first credit card account; charging an amount of the transaction to the first credit card account; and transmitting a receipt to a predetermined location of the customer. The predetermined location may be an e-mail address of the customer or a server residing on the network. By receiving digital receipts, a customer or end-user will be able to digitally store these receipts and view or print the receipts out when necessary. Furthermore, the customer will be able to manage the receipts with conventional software packages.

20 Claims, 6 Drawing Sheets

SYSTEM AND METHOD FOR ISSUING DIGITAL RECEIPTS FOR PURCHASE TRANSACTIONS OVER A NETWORK

CROSS REFERENCE TO RELATED APPLICATION

The present application is a continuation of U.S. application Ser. No. 11/369,598, filed Mar. 7, 2006, the contents of which are hereby incorporated by reference, now U.S. Pat. No. 7,896,242, issued Mar. 1, 2011, which is a continuation-in-part of U.S. application Ser. No. 11/212,419, filed Aug. 26, 2005, now U.S. Pat. No. 7,575,154, issued Aug. 18, 2009.

BACKGROUND

1. Field

The present disclosure relates generally to data processing and financial decision systems, and more particularly, to a system and method for issuing digital receipts for purchase transactions over a network.

2. Description of the Related Art

Credit cards are a huge business and a large part of the world economy. Credit cards can be basically broken down into three categories: national/universal cards such as MasterCard™ and Visa™; travel and entertainment cards such as American Express™ and Diners Club™; and local merchant/house cards that each store separately issues for their stores (such as Office Depot™, Sears™, Macy's™) or the brands in their store chain, for example, the Gap™ card is valid for all their branded stores including Old Navy™, Gap™, and Banana Republic™. Stores, restaurants, and other establishments also issue affiliate/membership/reward cards for customers to use in their stores. Examples of these cards would be the Blockbuster membership card used when customers rent movies, or the frequent purchase card used by establishments like TGI Fridays™, Barnes and Noble™, or Costco™.

Despite credit risk and credit card fraud which are large factors in the industry, stores are very motivated to issue their own credit cards because of the high profit associated with an individual merchant/house credit card. In many cases, for example, a credit card issuer will charge upwards of 16% interest on unpaid balances, while the merchants cost of extending credit is far below this number. In fact stores and store employees are extremely motivated to sign up customers to their own brands of credit cards, and acquisition costs of getting a credit card customer can run hundreds of dollars.

Customers for individual stores are frequently incentived by the merchants to sign up for credit cards with special promotions and prizes. Frequently, customers will receive a one-time discount on their purchases if they will sign up for the account. Millions of customers do sign up each year in the United States to receive individual merchant credit cards.

One of the main reasons customers do not sign up for individual store accounts, e.g., a merchant/house accounts, is that they do not wish to carry an individual credit card for each and every store. It is far easier to just keep one or two national credit cards that can be used at hundreds of merchants, then many merchant/house cards that must be carried. In some cases, if a customer does not have his store card, a store will allow the customer to show a driver's license or other identification and they will look up the customer's account number; but in many cases this takes a great deal of time during check-out, if it can be done at all.

Another reason that customers will not sign up for individual store accounts is that the sign up and approval process takes time. While the sign up and approval for most merchants is very automated, it is still a cumbersome and time consuming process that many people are not prepared to go through particularly when the merchant is trying to get them to sign up on the spur of the moment during the check-out process.

Customers also routinely receive receipts for goods or services purchased usually at the time of purchase. These receipts are customarily in paper form. The receipts are extremely important for a number of reasons. For example, a receipt is usually (but not always) needed to return or replace the merchandise; a receipt is needed to verify and compare against the credit card charge bill to make sure that the credit card charges are accurate; the receipt is needed for income tax purposes; a receipt is needed for insurance purposes in the event of loss or damage to property; a receipt is needed to verify proof of purchase for a manufacturer rebate; a receipt is needed in many cases for manufacturer warranty claims; etc.

However, the problem with paper receipts is that many times they are lost or discarded by the purchaser. Studies have shown that only a minority of individuals retain receipts for all merchandise purchased and even fewer have receipts for older merchandise.

Therefore, a need exists for techniques to facilitate providing customers with receipts for goods or services purchased that can be accessible by the customer at a time after the point of sale. A further need exists for techniques to enable a merchant to provide to a customer additional purchase/upgrade opportunities for the merchandise or services that they have purchased.

SUMMARY

A system and method for a merchant to provide a digital electronic receipt to a customer at the time of purchase are provided. The digital receipt will be stored on the global computer network (e.g., the Internet) or a local network and may be accessed and/or downloaded by the customer upon request. The receipt will be electronically available 24 hours a day, seven days a week. Alternatively, the digital receipt will be e-mailed to the customer.

The present disclosure also details a system and method of utilizing the customer's credit card, by cross associating customer information with credit card information, to identify the customer and provide the receipt. Further details are also provided on a system and method to allow the merchant to offer the customer additional services and upgrades for the merchandise or services that they are providing the receipt for.

According to one aspect of the present disclosure, a method for issuing a purchase transaction receipt over a network is provided. The method including the steps receiving information for a first credit card account for executing a transaction; retrieving a first customer record from a database using information from the first credit card account; charging an amount of the transaction to the first credit card account; and transmitting a receipt to a predetermined location of the customer. The predetermined location is an e-mail address of the customer or a server residing on the network.

In another aspect, the method includes the step providing at least one offer with the receipt.

According to another aspect of the present disclosure, a terminal for issuing a digital receipt for a purchase transaction includes an input device configured for receiving information for a first credit card account for executing a transaction; at least one database storing at least a first credit card account record and at least one associated customer record, the at least one customer record including a predetermined location for receiving the digital receipt; and a processor configured for verifying the first credit card account for an amount of the transaction, retrieving a first customer record from the database using the information from the first credit card account record, determining the predetermined location of the customer and transmitting the receipt to the predetermined location.

In a further aspect, the terminal includes a mail server for e-mailing the receipt to an e-mail address of the customer.

In another aspect, the terminal includes a communication device configured to transmit the receipt to a remote server for storing the receipt.

In another aspect, the terminal includes at least one second database for storing the at least one receipt and a communication device configured to provide access to the customer of the at least one receipt.

According to another aspect of the present disclosure, a system for issuing a purchase transaction receipt over a network is provided. The system includes a remote server including a database storing a first credit card account record and at least one associated customer record, the at least one customer record including a predetermined location for receiving the receipt; a terminal configured for receiving information for a first credit card account for executing a transaction and for transmitting the first credit card account information to the remote server, wherein the remote server is configured to verify the first credit card account for an amount of the transaction, retrieving a first customer record from the database using the information from the first credit card account record, determining the predetermined location of the customer and transmitting the receipt to the predetermined location.

In a still further aspect of the present disclosure, a program storage device readable by a machine, tangibly embodying a program of instructions executable by the machine to perform method steps for issuing a purchase transaction receipt over a network includes the method steps receiving information for a first credit card account for executing a transaction; retrieving a first customer record from a database using information from the first credit card account; charging an amount of the transaction to the first credit card account; and transmitting a receipt to a predetermined location of the customer.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

A system and method for issuing and managing a plurality of credit cards are provided. The system and method of the present disclosure enables a merchant to sign up customers for their proprietary, e.g., merchant/house, credit card without credit risk to the merchant and then allowing the customers to utilize the proprietary account (e.g., house) without carrying the merchant's credit card on their person.

Figure 1:
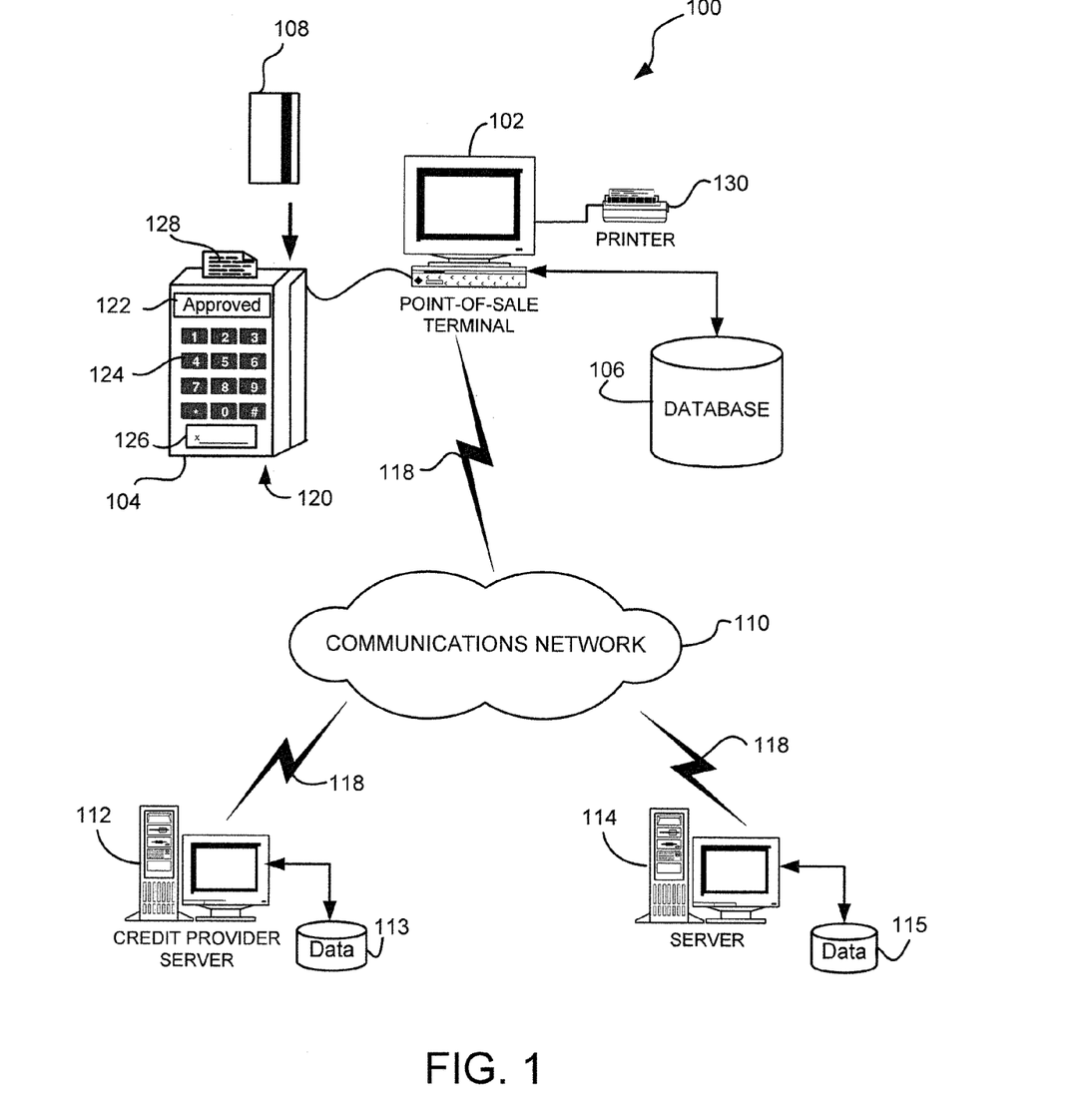
FIG. 1 is a diagram of a system for issuing and managing a plurality of credit card accounts in accordance with an embodiment of the present disclosure.

Referring to FIG. 1, a system 100 for issuing and managing a plurality of credit cards is illustrated. The system 100 includes a point-of-sale (POS) terminal 102 for completing a purchasing transaction and an input/output (I/O) customer transaction terminal 104. The (I/O) terminal 104 includes an electronic data capture (EDC) swipe reader 120 for reading information from a credit card 108, a display 122 for providing information to a customer, a keypad 124 for customer entry of information such as a PIN number, and a touch screen 126 for receiving a customer's signature. The (I/O) terminal 104 may also include a printing mechanism 128 for printing receipts, or alternatively, the POS terminal 102 may include a printer 130 for printing receipts, terms, offers, etc. The system 100 further includes a database 106 that includes a plurality of records on customers or holders of national credit cards. This information may be supplied on a secured basis by credit card companies, e.g., MasterCard™, VISA™, DISCOVER™, etc, and other companies as a means to verify a credit card holder's identity.

Figure 4:
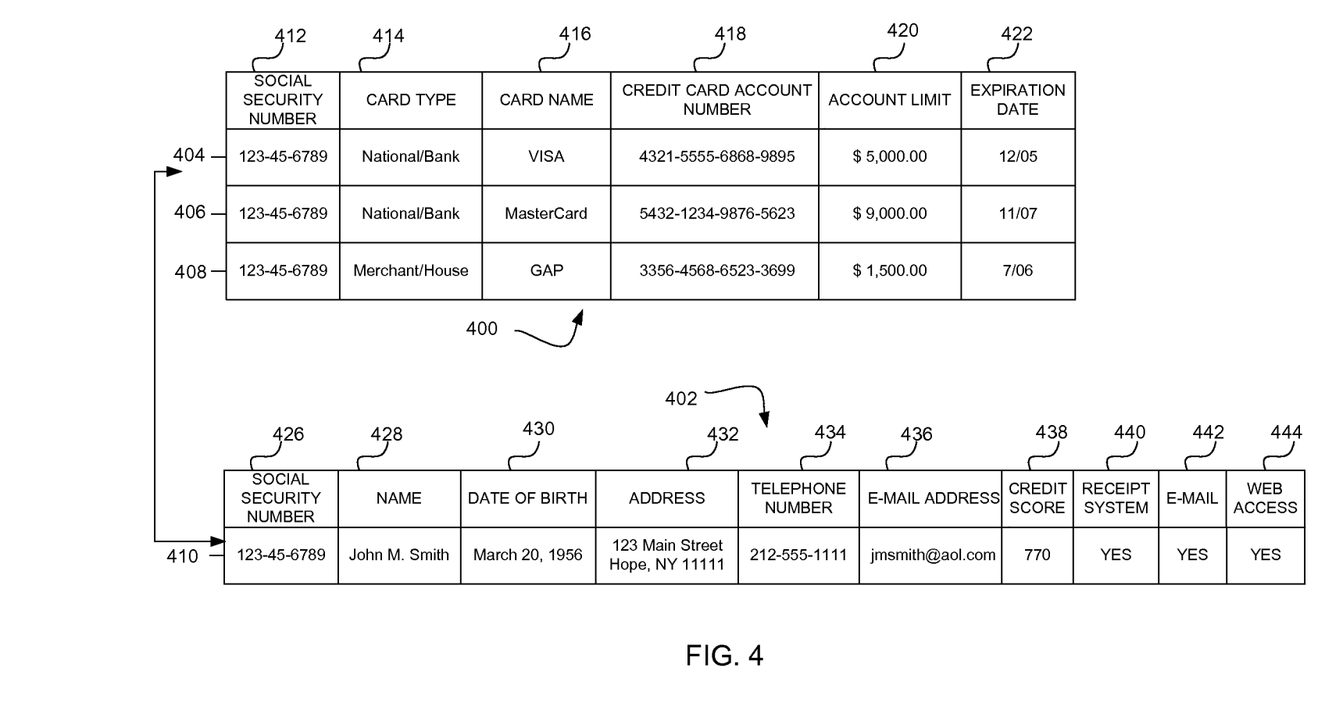
FIG. 4 is a diagram of a plurality of records of a relational database employed in accordance with the present disclosure.

Referring to FIG. 4, the database 106 will includes at least two tables for each customer/holder of a national credit card—a credit card account table 400 and a personal information table 402. The personal information table 402 will include a plurality of fields such as a card holder's social security number 426, the holder's current name 428, the holder's date of birth 430, the holder's address 432, the holder's phone number 434 and/or e-mail address(es) 436. Preferably, the holder's personal information record 410 will include the holder's credit score 438 as generated by any existing credit bureau, e.g., Experian™, Equifax™ and TransUnion™. The holder's credit score can be linked to the actual credit bureau's database so that the information will be current, or alternatively, the holder's credit score can be updated from time to time, e.g., whenever the holder's credit score changes by a predetermined amount. The credit card account table 400 will include a record 404, 406, 408 for each credit card the holder possess. Each record of the credit card table 400 will include at least the following fields such as social security number 412, card type 414 (e.g., national, travel and entertainment, house/merchant), credit card name or issuer 416, a corresponding credit card account number 418, an account limit 420 and an expiration date 422. The personal information table 402 will be linked to the credit card account table 400 via the use of primary and foreign keys as is known in the art. In this non-limiting example, the holder's social security number is used as the key.

The system 100 further includes credit provider server 112 for approving transactions conducted with a credit card and communication network 110 for enabling communications between POS terminal 102 and server 112.

Figure 2:
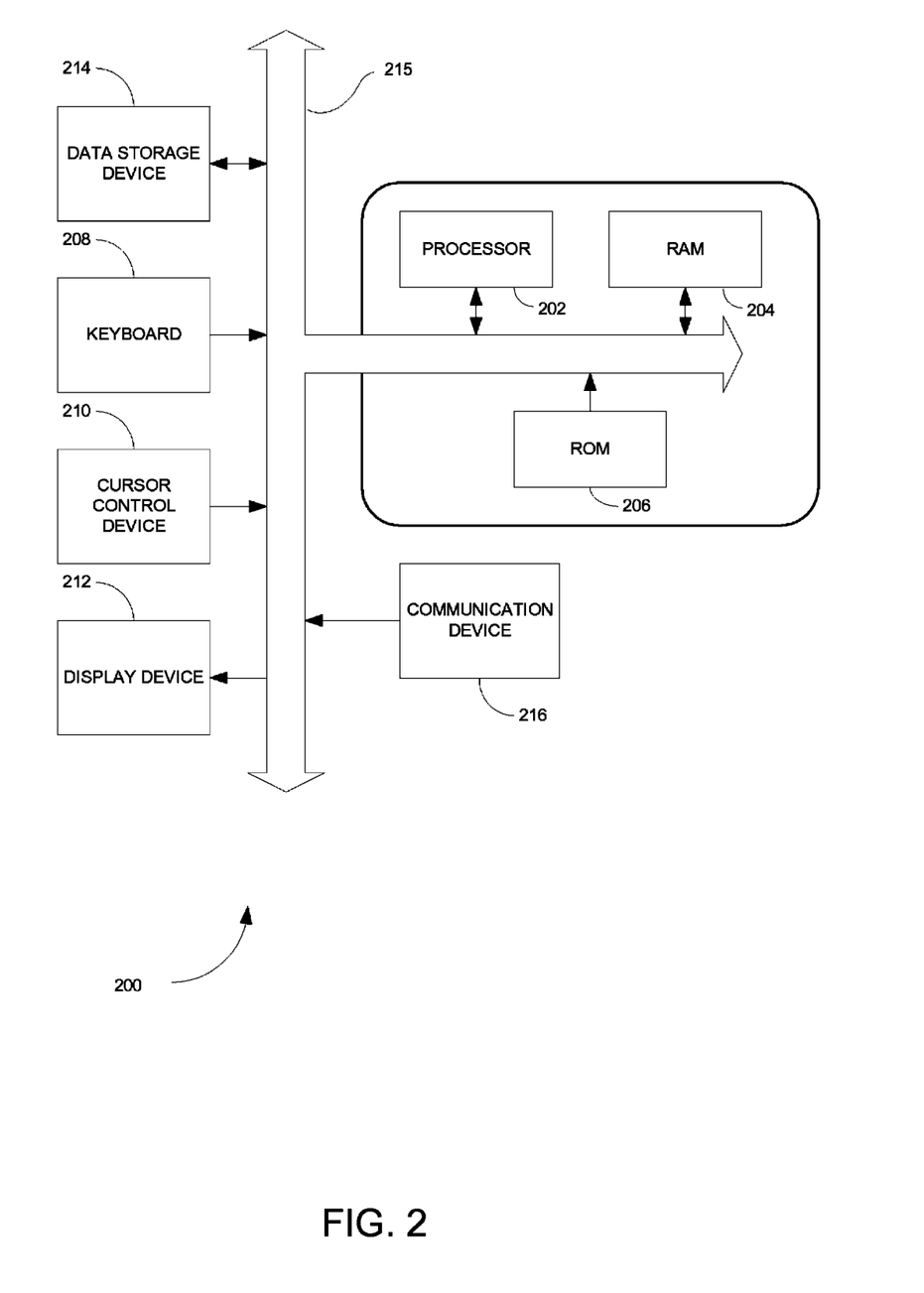
FIG. 2 is an exemplary computer for use in the system shown in FIG. 1.

It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by, a machine, e.g., POS terminal 102 or server 112, comprising any suitable architecture such as a personal computer, a workstation or server. Referring to FIG. 2, preferably, the machine 200 is implemented on a computer platform having hardware such as one or more central processing units (CPU) 202, a random access memory (RAM) 204, a read only memory (ROM) 206 and input/output (I/O) interface(s) such as a keyboard 208, cursor control device 210 (e.g., a mouse or joystick) and display device 212. A system bus 215 couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the application program (or a combination thereof) which is executed via the operating system.

In addition, various other peripheral devices may be connected to the computer platform by various interfaces and bus structures, such a parallel port, serial port or universal serial bus (USB). One such peripheral device may include a communications device 216, e.g., a modem, satellite relay, wireless connection, etc., for enabling communications from the point-of-sale terminal 102 to various credit providers, e.g., credit provider 112. Other peripheral devices may include additional storage devices 214 and a printer.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The POS terminal 102 may operate in a networked environment using logical connections to one or more remote computers. The remote computer may be a personal computer, a server, a router, a network PC, a peer device or other common network node, and typically includes many or all of the elements described above relative to the machine 200. It is to be appreciated that the network 110 may be a local area network (LAN), wide area network (WAN), the Internet or any known network that couples a plurality of computers to enable various modes of communication via network messages. For example, the system may be a corporate intranet including a single server and multiple POS terminals housed within a single facility, or alternatively, multiple servers with multiple POS terminals located in various geographic locations. The POS terminals may communicate to the servers 112, 114 and network 110 via any known communication link 118, for example, dial-up, hardwired, cable, DSL, satellite, cellular, PCS, wireless transmission (e.g., 802.11a/b/g), etc. Furthermore, the devices will communicate using the various known protocols such as Transmission Control Protocol/Internet Protocol (TCP/IP), File Transfer Protocol (FTP), Hypertext Transfer Protocol (HTTP), etc. During a purchasing transaction, the computing devices may employ Hypertext Transfer Protocol Secure (HTTPs), Secure Sockets Layer (SSL) Protocol, Secure Electronic Transaction (SEC) Protocol, etc.

Figure 3:
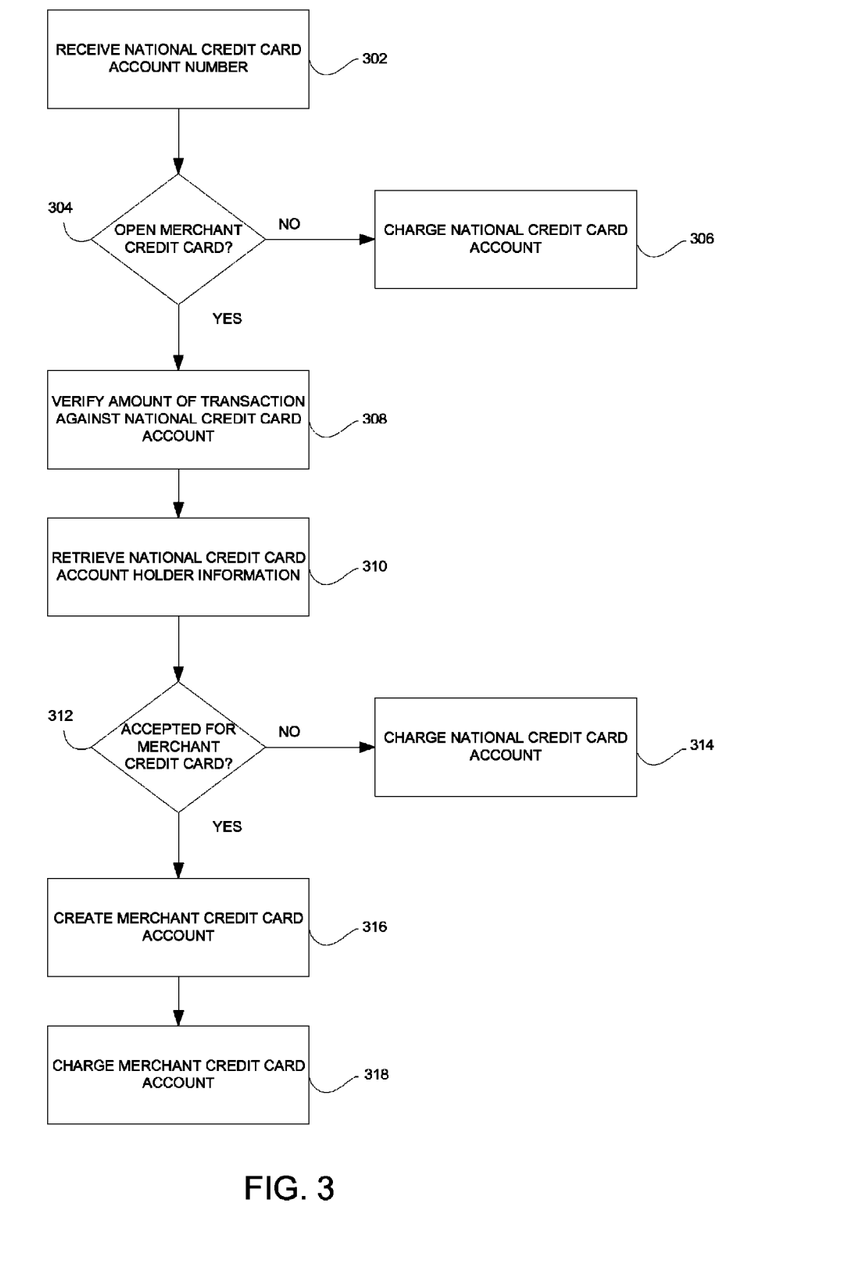
FIG. 3 is a flow diagram illustrating a method for issuing and managing a plurality of credit card accounts in accordance with an embodiment of the present disclosure.

With reference to FIGS. 1, 3 and 4, the method and system of the present disclosure will now be described.

Upon selecting an item for purchase, a customer will approach a service counter or check-out desk of a particular store or merchant to purchase the selected item. When the customer presents a national credit card to the store cashier, the store cashier will ask the customer if they wish to charge the purchase to the individual house/store's account rather then the national card account. The customer will either say "yes" or "no". In the event of a "no", the customer will be asked if they have an individual store account. For example, if the customer is in a Gap™ store and presents a MasterCard™ credit card, the customer will be asked if he would like to charge his purchase to his Gap™ card. If the customer says "no", the customer will be asked if he has a house/store account. If the customer says "no", he/she will be offered an instant store account.

Upon presenting the national credit card, a user of the system 100, e.g., a store clerk/cashier, will enter the credit card information to the POS terminal 102, step 302. The information will be entered into the terminal 102 by entering the information via a keyboard or by reading the information from a magnetic strip located on the credit card via (I/O) terminal 104. The clerk/cashier will than ask the holder of the credit card if they would like to open a house/store/merchant credit card, or alternatively, the question will be presented to the holder via the display 122 of (I/O) terminal 104 (step 304). If the holder answers "no", the national credit card will be charged by the POS terminal 102 accessing the credit provider server 112 as is known in the art (step 306).

If the holder desires to open a house credit card, the terminal 102 will verify the credit card for the amount of purchase via credit provider server 112 but will hold the charge (step 308). The clerk will then tell the store POS terminal 102 that the customer is signing up for an individual store account. The customer will then be presented with forms to sign either electronically through terminal 104 via a stylus and touch screen 126 or by paper. The forms may be in the form of a conventional receipt printed by print mechanism 128 or printer 130, where the holder agrees to the amount of the purchase, but will also include the terms and conditions of the new house credit card, e.g., finance charges, annual fees, etc. The clerk will then tell the store POS terminal 102 that the charge to the national card should be held until the customer is approved by the store for their individual account. In many cases, this is an electronic process that just takes a few minutes. However, whether a short or long time period, the customer will not be required to wait because the store will have the customers national credit card as security. The customer will be told and will have agreed that the charges for the purchase will be put on the merchant's credit card account (e.g., the new house/store/merchant account) if the account is approved, and put on the national credit card tendered if the account is not approved. The customer will thus be able to sign up for the merchant's in store account in approximately the same amount of time that it will take to approve his national credit card.

The customer is then allowed to leave the POS terminal 102 and the computer system can determine the customers suitability for the house credit card with the information that will be contained in the credit card database 106. The terminal 102 will use the national credit card information entered or read from the credit card to access the credit card information table 400. Via the using of primary and foreign keys, the terminal 102 will use information from the credit card account record 404 to access the personal information record 410 of the holder. From the holder's personal record 410, terminal 102 will be able to retrieve the necessary information to establish a house/merchant account for the holder. Preferably, the record 410 will include the holder's credit score. The terminal 102 may determine the holder's suitability for the house credit card based solely on their credit score or by using the information in the holder personal information record 410 to access a credit bureau for approval (step 312). If the customer is suitable, the account will be set up and the customer will receive his card at the address contained in the database. The credit card information table 400 of database 106 will be updated with a new record 408 which will include the customer's new assigned store credit card number, along with the record 404 of the credit card number of the national card that the customer applied with. Both of these numbers will be maintained in the database that the store uses for credit card approvals and both will be cross associated by the database. Once the account is established, the new house credit card account will be charged the amount for the transaction (step 318)

Alternatively, if the customer is rejected in step 312, the holder's purchase will then be charged to his national credit card (step 314). Furthermore, the holder will be notified of the rejection in writing at the address indicated in the database via mail or will be notified via e-mail at the address indicated in the database. It is to be appreciated that the written rejection may be a preformatted form generated automatically by terminal 102.

Figure 5:
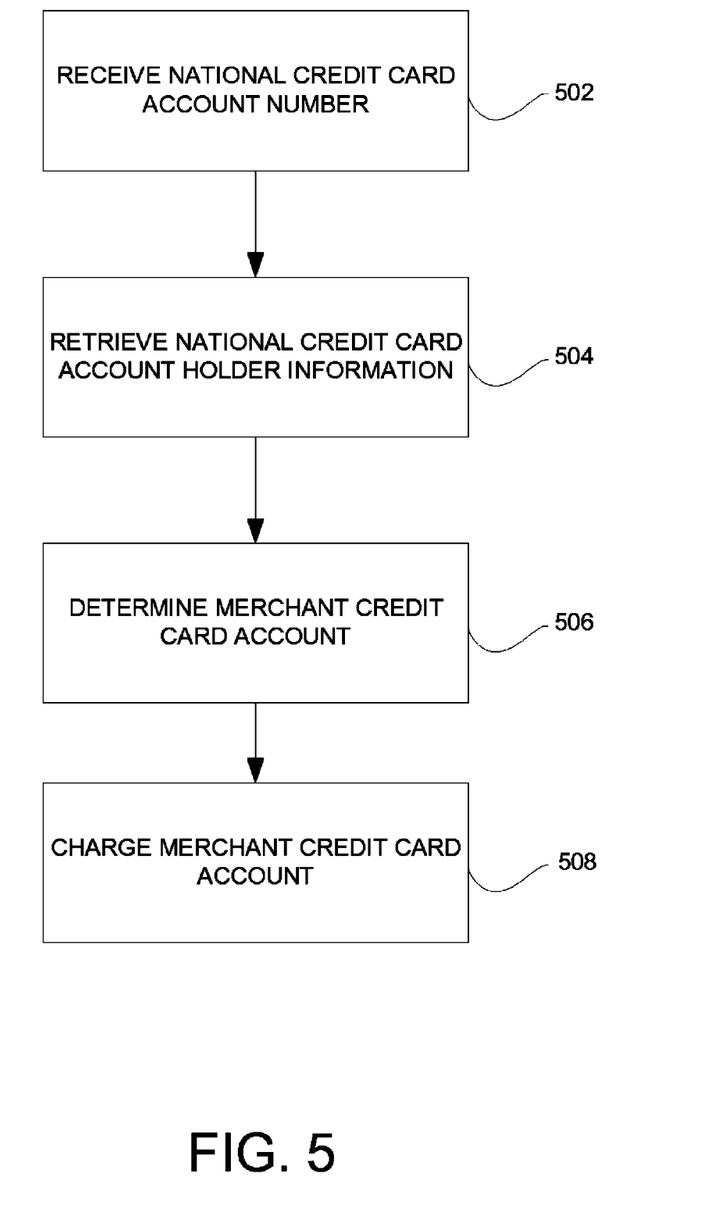
FIG. 5 is a flow diagram illustrating a method for executing a transaction with a single credit card.

Once the second credit card account is created, the holder will be able to charge transactions to the second credit card account without having the second credit card on their person. Referring to FIG. 5, when a holder conducts a subsequent transaction, the holder (at the time of purchase) will indicate that they have a store account. Then, the customer will be asked to present the store card for that account or alternatively the national credit card that he used to sign up for the account or any other national credit card that has been cross associated in database 106. The holder will presents their national card, the point-of-sale terminal 102 will read the card, and transmit this information to the database 106 (step 502). The terminal 102, using standard database software and processing power, will look up the number of the national credit card (step 504), and then check to see if a store credit card number is cross associated with this national card (step 506). If the store card is associated with the national card, then the store card number will be processed for credit card approval using the standard approval techniques and protocols that the merchant or approval company maintains (step 508).

In the event that a customer has a store account and then offers a national account card that is not on file (for instance, the customer has changed national account cards or his national account card number has changed) then the customer will be asked to establish and verify his/her identity. The holder will present their national credit card and the information read from the national credit card will be used to locate the personal information record 410 of the card holder. The information contained in the holder's personal information record 410 and the information read from the national credit card will be used to create a new credit card account information record 406 which will be added to table 400 and cross associated with any other existing credit card accounts belong to the holder. Thus allowing the holder to once again present his selected national credit card, as a means of charging purchases to the store/merchant credit card account.

In another embodiment, the system will store the national credit card information into a remote server database 115, accessible by a local point of sale terminal or terminals, e.g., terminal 102, wherein when the national credit card information is presented at purchase, it is either keyed in or electronically input to the terminal, transmitted to the remote server 114, and the remote server 114 will use standard computer dbase programs (such as Oracle™, Microsoft™ SQL, Sybase™, etc) to cross associate and find if that national credit card account is associated with an individual store credit card. If the national credit card is cross associated with a store credit card, the remote server 114 will communicate back to the point-of-sale terminal 102 the store credit card number and credit card name. In a further embodiment, the database 115 may reside with a credit provider server 112 and the credit provider server 112 will also verify the credit card worthiness (e.g., approve or disapprove) of the credit card holder using standard approval algorithms and processing.

In further embodiments of the present disclosure, a system and method for providing digital receipts for purchase transactions are provided. The system and method enables a merchant to provide a digital electronic receipt to a customer at the time of purchase which will be delivered to a predetermined location designated by the customer. This receipt will be stored on a server either on a local network or on the global computer network, i.e., the Internet, and may be accessed and/or downloaded by the customer upon request. The receipt will be electronically available 24 hours a day, seven days a week. Alternatively, the receipt will be e-mailed to the customer. By receiving digital receipts, a customer or end-user will be able to digitally store these receipts and view or print the receipts out when necessary. Furthermore, the customer will be able to manage the receipts with conventional software packages.

Figure 6:
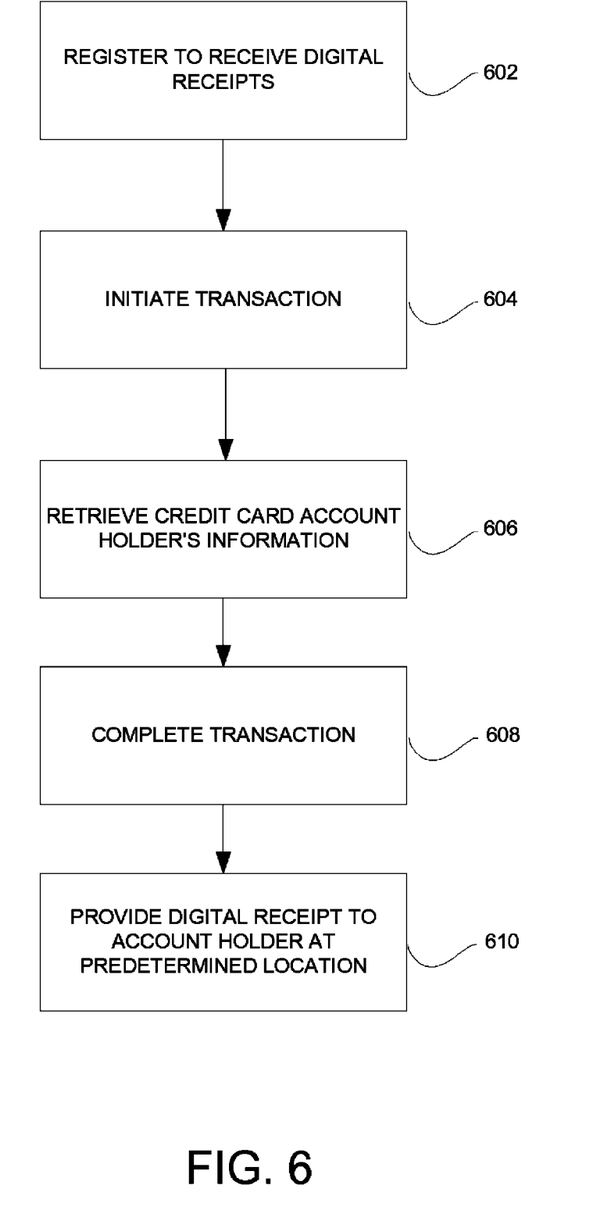
FIG. 6 is a flow diagram illustrating a method for issuing digital receipts for purchase transactions in accordance with an embodiment of the present disclosure.

Referring to FIG. 6, a customer or end-user will register to receive digital receipts (step 602). In one embodiment, the customer will register for the receipt system when the customer is signing up for a house/merchant credit card account as described above. In this scenario, the store clerk will ask the customer if he wants to opt into the receipt system so that he receives a digital receipt each time he makes a purchase. The option to opt into the receipt system may be presented to the customer via (I/O) terminal 104 when completing the transaction. Alternatively, the customer may opt into the receipt system when using a national credit card at the time of any purchase either manually by the store clerk at the POS terminal 102 or by the customer via the (I/O) terminal 104. When using the national credit card for a purchase, the store clerk will ask the customer which credit card or cards he will be using for the purchases that he wishes digital receipts for. This information will be transmitted to the credit provider server 112 with the purchase transaction information. As a further alternative, the customer will be able to access a web site residing on a server on the Internet and will be able to register for the receipt system and manually enter all of the credit card accounts they wish to receive digital receipts for.

Regardless of how the customer registers for the receipt system in step 602, the personal information record 410 related to the customer will be updated as shown in FIG. 4. The personal information record 410 for the customer will include a receipt system opt in field 440 which will signify whether the customer desires to receive digital receipts. If the customer or holder of the credit card has opted in, the personal information record 410 will further include an e-mail field 442 to indicate if the customer would like to receive the receipts via e-mail and a web access field 444 for indicating the customer would like the receipts transmitted to a web server for later access by the customer. It is to be appreciated that the customer may elect to receive the receipt via e-mail and have the receipt sent to the web server. Furthermore, during this registration process, an identifier, e.g., a password, will be created for the customer to use during web access to the digital receipts. Initially, the password may be a default password, e.g., the last four digital of the user's social security number, the user's last name, etc. Preferably, the customer will be granted access to the receipt system using a combination of their e-mail address, i.e., as a user name, and the password.

It is to be appreciated that this database may be kept on a computer processing terminal that is tied into a network that is at the store's location such as POS terminal 102 shown in FIG. 1, or the database may reside on a server as part of a network that is at a remote location such as remote server 114. It is further to be appreciated that the customer may change/edit his credit card information or password at any time either by telling the merchant (e.g., at the point of sale, via telephone/e-mail, etc.) to amend this information or with permission electronically accessing the computer processor associated with the database through the network.

After the customer is registered to receive digital receipts, the customer may initiate a purchase transaction with a merchant (step 604). The customer may use any credit card they carry on their person to conduct the transaction and the system will be able to retrieve the necessary information to transmit a digital receipt to the customer. In accordance with the embodiments described above, the customer will present a national/house/merchant credit card to conduct the transaction. The terminal 102 will read the credit card information via I/O terminal 104 and use this information to retrieve the credit card holder's information from the database 106 (step 606). At this point and as described above, the customer can select which credit card account he would like to use to complete the purchase (step 608). Regardless of which credit card account the customer selects, the terminal 102 will access the personal information record 410 of the holder of the credit card, by the cross association described above, and will determine if the customer has opted into the receipt system.

The processor of the terminal 102 then selects the relevant purchase receipt information and forwards this information to the account holder at a predetermined location (step 610). If the user has elected, the terminal 102 will e-mail this information to the account holder. In this embodiment, the terminal 102 will include an appropriate server application for sending e-mails. For example, to execute e-mail, a mail server will be provided including a Simple Mail Transfer Protocol (SMTP) server 114 for handling outgoing e-mail messages and a POP3 (Post Office Protocol version 3) server for handling incoming e-mail messages. Alternatively, the terminal 102 will execute a client e-mail application, e.g., Microsoft Outlook, which will forward e-mails to an e-mail server residing on the network, e.g., the Internet, which will then relay the digital receipt to the appropriate recipient. The formatting of the digital receipt e-mail is not important as long as the receipt includes all the relevant information from the sale or transaction, e.g., time and date, store/merchant location, purchase total, itemized list of products purchased, credit card used, etc.

Alternatively, if the user has selected to receive this information on a website on the global computer network (e.g., the Internet) that the merchant has set up, the terminal 102 will transmit the purchase information to the website. The user will have to use a user name, e.g., an e-mail address, and password to access the site. On the site, the user will find a history of his purchases. The user will be able to organize/sort/and manipulate this data to the user's specifications using standard computer processing power. For example, the user may be able to sort the receipts by a selected criteria, for example, by dates, store location, description of item, etc. The user may review a plurality of receipts and highlight or select which purchases were personal or business expenses, and then print out a report of business expenses for tax reporting.

The user may download the receipt or report to any designated terminal, e.g., a local personal computer, hand-held device such as a mobile phone or Pocket PC, etc. The user will also be able to download this information to other applicable programs like Quicken™, QuickBooks™, Microsoft Money™, Microsoft Excel, etc.

In a further embodiment, system and method will enable the merchant to offer the customer additional services and upgrades for the merchandise or services that they are providing the receipt for.

If the website access is elected by the user as a means to receive the purchase receipt, then the merchant would have an opportunity to use standard computer processing power to analyze the customer's purchases (such as demographic or psychographic analysis programs) and then to make offers to the user based on those purchases. These offers could include but are not limited to offers to provide extended warranties for merchandise purchased, offers to upgrade merchandise, offers to process rebates for merchandise purchases, information on products that are on product recall, and offers to sell the user additional merchandise that based on previous purchases the merchant believes the user would be interested in (using psychographic and demographic profiling). These additional offers may be present to the user as a pop-up while the user is viewing the receipts, may be a hyperlink appended to a particular receipt being viewed by the user, etc. It is to be appreciated that similar offers may be e-mailed to the user if the user has elected to receive the receipts via e-mail. These offers may be based on the single purchase transaction relating to the receipt. The user will be presented with the option to opt-in to receive these offers during registration and at anytime later may opt out of receiving any further offers.

In another embodiment, the system may be configured to automatically print out a hard copy receipt, e.g., a back-up or confirmation receipt, to be forwarded to a physical address, e.g., home address, of the user, via standard postal mail, express delivery, etc. The printed receipt may be printed in a presealed mailer wherein a printing device prints the receipt on the inside of the mailer by only striking the outside of the mailer as is known in the art. The use of this type of mailer will keep the process highly automated and the mailer will simply be forwarded to a courier for delivery. Furthermore, a summary of the digital receipts may be printed out and forwarded to the recipient upon certain predetermined thresholds, e.g., on a monthly basis, quarterly basis, semiannual basis or yearly basis.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A method for issuing a purchase transaction receipt over a network, the method comprising:
   receiving, by at least one server in communication with the network, a registration request to receive digital receipts in association with a first credit card account;
   storing, by the at least one server, at least one first customer record in a database, the at least one first customer record associating the first credit card account with a destination associated with a first customer;
   receiving, at the at least one server from a point-of-sale terminal, information identifying the first credit card account and information about a transaction;

retrieving, by the at least one server, the at least one first customer record from the database based on the information identifying the first credit card account;

initiating a charge of an amount of the transaction to the first credit card account; and automatically transmitting a digital receipt for the transaction to the destination associated with the first customer without input from the first customer.

2. The method as in claim 1, further comprising:
providing at least one solicitation with the digital receipt.

3. The method as in claim 2, wherein the at least one solicitation comprises one of the group consisting of an extended warranty for merchandise purchased in the transaction and an upgrade to merchandise purchased in the transaction.

4. The method as in claim 2, wherein the at least one solicitation is a solicitation to process rebates for merchandise purchased in the transaction.

5. The method as in claim 2, wherein the at least one solicitation comprises information on a product recall for merchandise purchased in the transaction.

6. The method as in claim 2, wherein the at least one solicitation is comprises an offer to sell additional merchandise based on previous purchases of the first customer.

7. The method as in claim 1, further comprising:
storing the digital receipt on the at least one server; and
providing access to the digital receipt at a time after completion of the transaction.

8. The method as in claim 7, wherein providing access to the digital receipt comprises permitting download of the digital receipt to a terminal of the first customer.

9. The method as in claim 8, wherein the terminal of the first customer comprises a spreadsheet software program configured to manipulate information in the digital receipt.

10. The method as in claim 8, wherein the terminal of the first customer comprises a financial software program configured to manipulate information in the digital receipt.

11. A terminal for issuing a digital receipt for a purchase transaction comprising:
a communication mechanism configured to receive, from a point-of-sale terminal via a network, information identifying a first credit card account of a customer and information about a transaction;
at least one database configured to store at least a first credit card account record and at least one associated customer record, the at least one customer record including an indication of a destination for digital receipts, wherein the destination is associated with the customer; and
one or more computing devices configured to verify the first credit card account for an amount of the transaction, to retrieve a first customer record from the at least one database based on the information identifying the first credit card account, and to determine the destination associated with the customer;
wherein the terminal is configured to automatically transmit a digital receipt for the transaction to the destination associated with the customer without input from the customer.

12. The terminal as in claim 11, wherein the one or more computing devices are configured to select at least one solicitation based on the information about the transaction and to transmit the at least one solicitation to the destination associated with the customer.

13. The terminal as in claim 11, wherein the terminal is further configured to transmit the digital receipt to a remote server for storing the digital receipt.

14. The terminal as in claim 11, further comprising:
at least one second database configured to store the digital receipt.

15. The terminal as in claim 14, wherein the terminal is further configured to provide to the customer access to the digital receipt.

16. A computer readable medium having instructions embodied thereon for issuing a purchase transaction receipt over a network, the instructions comprising:
instructions to receive, by at least one server in communication with the network, a registration request to receive digital receipts in association with a first credit card account;
instructions to store, by the at least one server, at least one first customer record in a database, the at least one first customer record associating the first credit card account with a destination associated with a first customer;
instructions to receive, at the at least one server from a point-of-sale terminal, information identifying the first credit card account and information about a transaction;
instructions to retrieve, by the at least one server, the at least one first customer record from the database based on the information identifying the first credit card account;
instructions to initiate a charge of an amount of the transaction to the first credit card account; and
instructions to automatically transmit a digital receipt for the transaction to the destination associated with the first customer without input from the first customer.

17. The computer readable medium as in claim 16, the instructions further comprising:
instructions to provide at least one solicitation with the digital receipt.

18. The computer readable medium as in claim 17, wherein the at least one solicitation comprises one of the group consisting of: an extended warranty for merchandise purchased in the transaction, an upgrade to merchandise purchased in the transaction, a solicitation to process rebates for merchandise purchased in the transaction, information on a product recall for merchandise purchased in the transaction, and an offer to sell additional merchandise based on previous purchases of the first customer.

19. The computer readable medium as in claim 16, the instructions further comprising:
instructions to store the digital receipt on the at least one server; and
instructions to provide access to the digital receipt at a time after completion of the transaction.

20. The computer readable medium as in claim 19, wherein the instructions to provide access to the digital receipt comprise instructions to permit download of the digital receipt to a terminal of the first customer.

* * * * *

UNITED STATES PATENT AND TRADEMARK OFFICE
CERTIFICATE OF CORRECTION

PATENT NO. : 8,534,551 B2
APPLICATION NO. : 13/018876
DATED : September 17, 2013
INVENTOR(S) : Rothschild It is certified that error appears in the above-identified patent and that said Letters Patent is hereby corrected as shown below:

In the Specification

In Column 6, Line 4, delete "then" and insert -- than --, therefor.

In Column 7, Lines 13-14, delete "(step 318)" and insert -- (step 318). --, therefor.

In the Claims

In Column 11, Line 23, in Claim 6, delete "solicitation is comprises" and insert -- solicitation comprises --, therefor.

Signed and Sealed this
Eighteenth Day of March, 2014

Michelle K. Lee
*Deputy Director of the United States Patent and Trademark Office*